United States Patent

[11] 3,625,937

[72] Inventor Walter Scholl
    Cologne, Stammheim, Germany
[21] Appl. No. 699,021
[22] Filed Jan. 19, 1968
[45] Patented Dec. 7, 1971
[73] Assignee Farbenfabriken Bayer Aktiengesellschaft
    Leverkusen, Germany
[32] Priority Jan. 26, 1967
[33] Germany
[31] F 51352

[54] CHROMIUM MIXED COMPLEX AZO DYESTUFFS
6 Claims, No Drawings

[52] U.S. Cl. .................................................. 260/145 B,
    8/4, 8/42 R, 8/42 B, 8/43, 117/138.8 R, 117/138.8
    A, 117/138.8 D, 117/144, 260/37 N, 260/149,
    260/163, 260/193
[51] Int. Cl. .................................................. C09b 45/06,
    C09b 45/16, D06p 1/10
[50] Field of Search .......................................... 260/145 B

[56] References Cited
UNITED STATES PATENTS

| | | | |
|---|---|---|---|
| 2,806,760 | 9/1957 | Brassel et al. | 260/145 X |
| 3,005,813 | 10/1961 | Brassel et al. | 260/145 |
| 3,067,191 | 12/1962 | North et al. | 260/145 |
| 3,203,948 | 8/1965 | Neier | 260/145 |
| 3,213,079 | 10/1965 | Maderni et al. | 260/145 X |
| 3,221,003 | 11/1965 | Scholl et al. | 260/145 |
| 3,314,932 | 4/1967 | Scholl et al. | 260/145 |

Primary Examiner—Floyd D. Higel
Attorney—Plumley, Tyner and Sandt

ABSTRACT: Chromium complex azo dyestuffs suitable for dyeing and printing nitrogen containing fiber materials particularly wool, silk, synthetic polyamides and polyurethanes in shades of yellow to orange color with improved fastness properties of the general formula

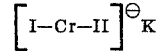

wherein K is a monovalent cation, I is a monoazo dyestuff of the formula

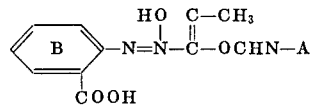

and II is a monoazo dyestuff of the formula

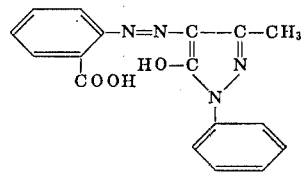

CHROMIUM MIXED COMPLEX AZO DYESTUFFS

It has been found that valuable chromium mixed complex dyestuffs are obtained by chroming a monoazo dyestuff of the formula

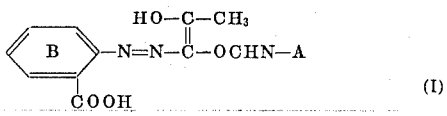
(I)

in which A represents an optionally substituted aryl radical, and in which an optionally substituted sulfonic acid amide group stands in at least one of the radicals A and B, in admixture with the monoazo dyestuff of the formula

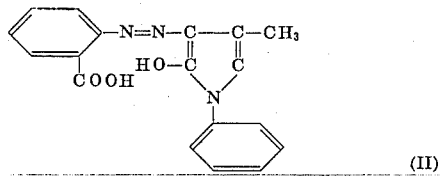
(II)

Instead of, according to this preferred method of operation of chroming the mixture of the dyestuffs (I) and (II), it is also possible to react the 1:1 chromium complex of the one dyestuff with the second metal-free dyestuff to obtain the 2:1 chromium complex compound.

The new dyestuffs correspond to the general formula

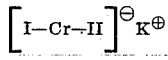

in which K denotes a monovalent cation, such as $Na^{\oplus}$, $K^{\oplus}$ and $Li^{\oplus}$.

The monoazo dyestuffs on which the process is based are obtained in known manner; the dyestuffs of the formula (I) are obtained, for example, by coupling diazotised 2-amino-1-carboxybenzene-4-sulfonamide or its derivatives substituted on the sulfonamide nitrogen, such as 2-amino-1-carboxybenzene-4-sulfomethylamide, -isopropylamide, -dimethylamide and -methyl-hydroxyethylamide, preferably in a weakly acidic to alkaline range, with an acetoacetic acid arylamide, or by coupling diazotised 1-aminobenzene-2-carboxylic acid with an acetoacetic acid-(sulfonamidophenyl)-amide under the same conditions. As acetoacetic acid arylamide, acetoacetic acid phenylamide is preferred which may contain in the phenyl nucleus nonionic substitutents, such as halogen (Cl, Br), lower alkyl and alkoxy groups as well as optionally substituted or acylated amino and sulfonamide groups.

The preparation of the monoazo dyestuff (II) by alkaline to weakly acidic coupling of 2-aminobenzoic acid with 1-phenyl-3-methyl-5-pyrazolone is known from the literature.

The dyestuffs (I) and (II) are preferably used in approximately equimolar amounts for chroming the mixture.

Chroming is effected according to known methods, for example, by the action of chromium salicylato complexes, or by the treatment with chromates in the presence of reducing carbohydrates, or with chromiumIII-chloride in ethylene glycol and formamide.

In the case of a stepwise synthesis of the new dyestuffs, the conversion of the dyestuff (I) into the 1:1 chromium complex is effected according to known methods. Those methods are advantageous which are carried out at temperatures of 100 –150 C., in an open vessel or under pressure, in organic solvents, such as ethylene glycol, with simple chromium salts, such as chromiumIII-chloride, in a weakly acidic range (e.g. according to the process of German Pat. Specification No. 479,373).

The reaction of the 1:1 chromium complex compounds thus obtainable with the metal-free dyestuffs (II) is carried out in an aqueous or organic medium, in a weakly acidic, neutral or, advantageously, in a weakly alkaline range, in the presence of acid-binding agents, such as sodium acetate, sodium carbonate or a dilute sodium hydroxide solution.

The new asymmetric chromium complex dyestuffs are yellow to orange-colored powders. They are eminently suitable for the dyeing and printing of nitrogen-containing fiber materials, in particular, wool, silk, synthetic polyamides and polyurethanes. Dyeings of clear yellow shades are obtained which exhibit very good fastness properties.

Those of the new dyestuffs are especially preferred which are obtained by mixed chroming the following monoazo dyestuffs:

1. a. 1-amino-2-carboxybenzene-5-sulfonamide → acetoacetic acid anilide, and
   b. 1-aminobenzene-2-carboxylic acid → 1-phenyl-3-methyl-5-pyrazolone, or
2. a. 1-aminobenzene-2-carboxylic acid → acetoacetic acid-(2 -,3 - or -4 -sulfonamidophenyl-)amide,
   b. 1-aminobenzene-2-carboxylic acid → 1-phenyl-3-methyl-5-pyrazolone.

In the following examples the parts by weight to parts by volume stand in the ratio of kilogram to liter; the temperatures are given in degrees centigrade.

EXAMPLE 1

32.2 Parts by weight of the monoazo dyestuff 1-carboxy-2-aminobenzene → 1-phenyl-3-methyl-pyrazolone-5 and 40.4 parts by weight of the monoazo dyestuff 1-carboxy-2-aminobenzene-4-sulfonamide → acetoacetic acid anilide are mixed by stirring in 40 parts by volume ethylene glycol and 200 parts by volume formamide, treated with 28 parts by weight chromiumIII-chloride (CrCl . 6 H O) and the mixture is heated to 105 . Chroming is effected at 105 –110 for 4 hours, the reaction mixture is cooled to 90 and introduced into 4200 parts by volume of water at 45 and 56 parts by volume of a 40 percent by volume sodium hydroxide solution. The dyestuff is precipitated by strewing in 10 percent common salt. It is filtered off with suction and dried at 50 in a vacuum.

The resultant chromium complex dyestuff is a yellow-brown powder which dissolves in water and dyes wool from an acidic to neutral bath in fast yellow shades.

EXAMPLE 2

40.4 Parts by weight of the monoazo dyestuff 1carboxy-2-amino-benzene-4-sulfonamide → acetoacetic acid anilide are mixed by stirring in 140 parts by volume ethylene glycol and 28 parts by weight of crystalline chromiumIII-chloride (CrCl . 6 H O), the mixture is heated to 125 –130 and this temperature is maintained for 2 hours. It is then cooled to 90 , 140 parts by volume formamide are added, 32.2 parts by weight of the monoazo dyestuff 1-carboxy-2-aminobenzene →1-phenyl-3-methyl-5-pyrazolone are introduced and the temperature is raised to 105 –110 . This temperature is maintained for a further 2 hours, the mixture is then cooled to 80 and the reaction solution poured into 4000 parts by volume of water. The chromium complex dyestuff is precipitated by strewing in 5 percent common salt, and the paste is dried at 50 in a vacuum.

The resultant 1:2 chromium complex azo dyestuff dyes wool from an organic acidic to neutral bath in yellow shades.

EXAMPLE 3

32.2 Parts by weight of the monoazo dyestuff 1-carboxy-2-amino-benzene → 1-phenyl-3-methyl-5-pyrazolone and 40.4 parts by weight of the monoazo dyestuff 1-carboxy-2-amino-benzene → acetoacetic acid-(4 -sulfamido)-anilide are stirred into 200 parts by volume formamide and 50 parts by volume ethylene glycol, 30 parts by weight chromiumIII-acetate are added and the mixture is heated to 105 . The reaction mixture is kept at 105 for 4 hours and then poured into a mixture of 4000 parts by volume of water and 600 parts by weight of common salt. The precipitated chromium complex dyestuff is filtered off with suction and dried at 50 in a vacuum. It is a yellow-brown powder which dyes wool from an organic acidic to neutral bath in fast yellow shades.

Similar dyestuffs are obtained when the following monoazo dyes are metal-complexed according to the process of this example (combination each of a and b):

a. 1-carboxy-2-aminobenzene → 1-phenyl-3-methyl-pyrazolone-5
b. 1-carboxy-2-aminobenzene → acetic acid-(3'-sulfamido)-anilide;

a. 1-carboxy-2-aminobenzene → 1-phenyl-3-methyl-pyrazolone-5
b. 1-carboxy-2-aminobenzene → acetic acid-(4'-sulfomethylamido)-anilide;

a. 1-carboxy-2-aminobenzene → 1-phenyl-3-methyl-pyrazolone-5
b. 1-carboxy-2-aminobenzene → acetic acid-(4'-sulfodimethylamido)-anilide;

a. 1-carboxy-2-aminobenzene → 1-phenyl-3-methyl-pyrazolone-5
b. 1-carboxy-2aminobenzene → acetic acid-(4'-sulpho-isopropylamido)-anilide;

a. 1-carboxy-2-aminobenzene → 1-phenyl-3-methyl-pyrazolone-5
b. 4-chloro-1-carboxy-2-aminobenzene → acetic acid-(4'-sulfamido)-anilide;

a. 1-carboxy-2-aminobenzene → 1-phenyl-3-methyl-pyrazolone-5
b. 1-carboxy-2-aminobenzene-4-sulphomethylamide → acetic acid-2'-chloroanilide;

a. 1-carboxy-2-aminobenzene → 1-phenyl-3-methyl-pyrazolone-5
b. 1-carboxy-2-aminobenzene-4-sulpho-dimethylamide → acetic acid-anilide;

a. 1-carboxy-2-aminobenzene → 1-phenyl-3-methyl-pyrazolone-5
b. 1-carboxy-2-aminobenzene-4-sulphodimethylamide → acetic acid-(4'-suphamido)-anilide;

a. 1-carboxy-2-aminobenzene → 1-phenyl-3-methyl-pyrazolone-5
b. 1-carboxy-2-aminobenzene-4sulfonamide → acetic acid-2'-methoxyanilide;

a. 1-carboxy-2-aminobenzene → 1-phenyl-3-methyl-pyrazolone-5
b. 1-carboxy-2-aminobenzene-4sulfonamide → acetic acid-2'-methyl-anilide;

a. 1-carboxy-2-aminobenzene → 1-phenyl-3-methyl-pyrazolone-5
b. 1-carboxy-2-aminobenzene-4sulfonamide → acetic acid-2',5'-dimethoxy-anilide;

a. 1-carboxy-2-aminobenzene → 1-phenyl-3-methyl-pyrazolone-5
b. 1-carboxy-2-aminobenzene-4-sulfonamide → acetic acid-2',5'-dimethoxy-4'-chloroanilide.

1 Part by weight of the chromium complex obtained according to example 1 is dissolved in 4000 parts by volume of water and mixed with 5 parts by weight ammonium acetate. 100 Parts by weight of woolen yarn are introduced at 50° and the dyebath is heated to boiling temperature within 20 minutes. Boiling is continues for 1 hour. The woolen yarn is subsequently rinsed and dried. A clear yellow dyeing of very good fastness properties is obtained.

We claim:
1. A chromium mixed complex dyestuff containing substantially one mole of a dyestuff of the formula

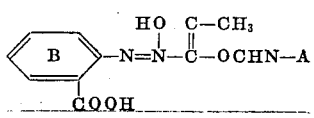

wherein A stands a member selected from the group consisting of phenyl or phenyl substituted with a member selected from the group consisting of chlorine, bromine, lower alkyl, lower alkoxy, amino, sulfonamido, N-lower alkyl sulfonamido, N-methyl sulfonamide or N-hydroxy ethyl sulfonamide, at least one of the ring member B and the residue A containing a sulfonamide group or a substituted sulfonamide group selected from the class consisting of N-lower alkyl sulfonamide, N-methyl sulfonamide, and N-hydroxy ethyl sulfonamide and substantially one mole of a dyestuff of the formula

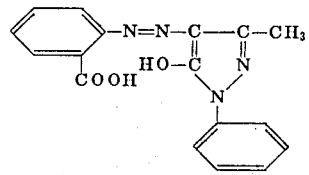

bound in complex union with one atom of chromium.

2. The dyestuff of claim 1 containing substantially 1 mol of the dyestuff of the formula

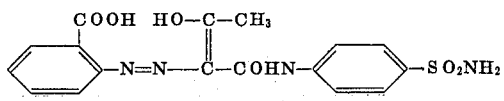

and substantially 1 mol of the dyestuff of the formula

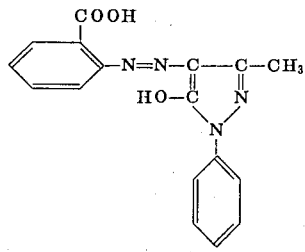

bound in complex union with one atom of chromium.

3. The dyestuff of claim 1 containing substantially 1 mol of the dyestuff of the formula

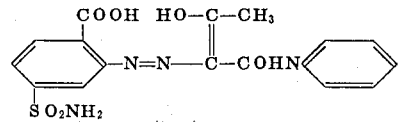

and substantially 1 mol of the dyestuff of the formula

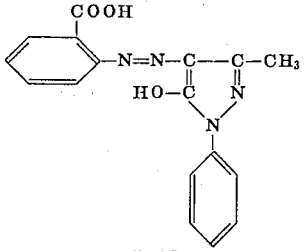

bound in complex union with one atom of chromium.

4. The dyestuff of claim 1 containing substantially 1 mol of the dyestuff of the formula

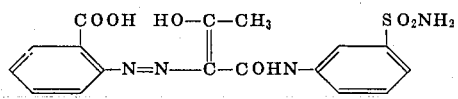

and substantially 1 mol of he dyestuff of the formula

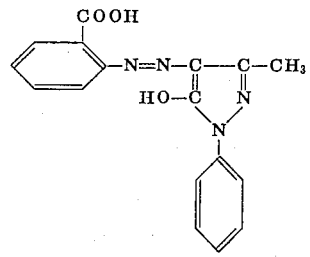

bound in complex union with one atom of chromium.

5. The dyestuff of claim 1 containing substantially 1 mol of the dyestuff of the formula

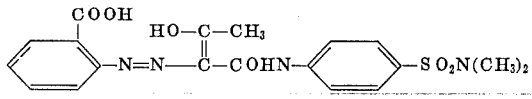

and substantially 1 mol of the dyestuff of the formula

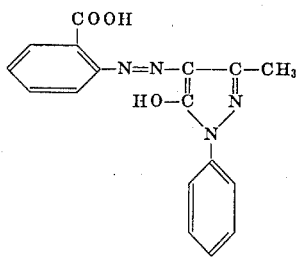

bound in complex union with one atom of chromium.

6. The dyestuff of claim 1 containing substantially 1 mol of the dyestuff of the formula

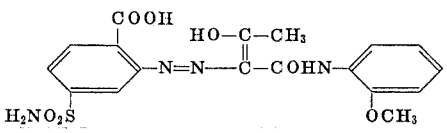

and substantially 1 mol of the dyestuff of the formula

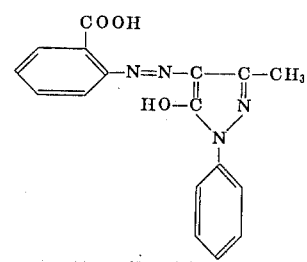

bound in complex union with one atom of chromium.

* * * * *

UNITED STATES PATENT OFFICE
CERTIFICATE OF CORRECTION

Patent No. 3,625,937            Dated Dec. 7, 1971

Inventor(s) Scholl, Walter

It is certified that error appears in the above-identified patent and that said Letters Patent are hereby corrected as shown below:

| COLUMN | LINE | ERROR |
|---|---|---|
| In the Abstract | | "HO C" should be ---HO-C--- |
| 1 | Form.II | "C-CH$_3$" should be ---C-CH$_3$--- <br> C                      N |
| 2 | 15 | "(2-,3- or-4)" should be ---(2'-, 3'-, or -4') --- |
| 2 | 30 | "(CrCl 6HO)" should be ---(CrCl$_3$6H$_2$O)--- |
| 2 | 31 | "105" should be ---105°--- |
| 2 | 31 | "105-110" should be ---105-110°--- |
| 2 | 32 | "90" should be ---90°--- |
| 2 | 33 | "45" should be ---45°--- |
| 2 | 36 | "50" should be ---50°--- |
| 2 | 45-46 | "(CrCl6HO)" should be ---(CrCl$_3$6H$_2$O)--- |
| 2 | 46 | "125-230" should be ---125-130°--- |
| 2 | 47 | "90" should be ---90°--- |
| 2 | 52 | "105-110" should be ---105-110°--- |
| 2 | 53 | "80" should be ---80°--- |

UNITED STATES PATENT OFFICE page 2
CERTIFICATE OF CORRECTION

Patent No. 3,625,937  Dated Dec. 7, 1971

Inventor(s) Scholl, Walter

It is certified that error appears in the above-identified patent and that said Letters Patent are hereby corrected as shown below:

| COLUMN | LINE | ERROR |
|---|---|---|
| 2 | 56 | "50" should be ---50°--- |
| 2 | 65 | "(4" should be ---(4'--- |
| 2 | 68 | "105" should be ---105°--- |
| 2 | 69 | "105" should be 105°--- |
| 2 | 72 | "50" should be ---50°--- |
| 3 | between lines 52 and 53 insert ---EXAMPLE 4--- | |
| 3 | 52 | "continues" should be ---continued--- |
| 3 | first form. | "HO C" should be ---HO-C--- |
| 3 | 74 | "sulfonamido" should be ---sulfonamide--- |
| 3 | 6 | "acetic" should be ---acetoacetic--- |
|   | 10 | "       "       "       " |
|   | 14 | "       "       "       " |
|   | 18 | "       "       "       " |
|   | 22 | "       "       "       " |
|   | 28 | "       "       "       " |
|   | 32 | "       "       "       " |
|   | 36 | "       "       "       " |
|   | 39 | "       "       "       " |
|   | 43 | "       "       "       " |
|   | 47 | "       "       "       " |
|   | 52 | "       "       "       " |

UNITED STATES PATENT OFFICE
CERTIFICATE OF CORRECTION

Patent No. 3,625,937  Dated December 7, 1971

Inventor(s) Scholl, Walter

It is certified that error appears in the above-identified patent and that said Letters Patent are hereby corrected as shown below:

| COLUMN | LINE | ERROR |
|---|---|---|
| 3 | 74 | "N-methyl" should be ---N,N dimethyl--- |
| 4 | 4 | "N-methyl" should be ---N,N dimethyl--- |
| 4 | Claim 4, line 65, | "he" should be ---the---. |

Signed and sealed this 5th day of September 1972.

(SEAL)
Attest:

EDWARD M.FLETCHER,JR.
Attesting Officer

ROBERT GOTTSCHALK
Commissioner of Patents